Nov. 3, 1964　　A. J. GRINER　　3,155,221
METERING APPARATUS
Filed Nov. 6, 1961　　5 Sheets-Sheet 5
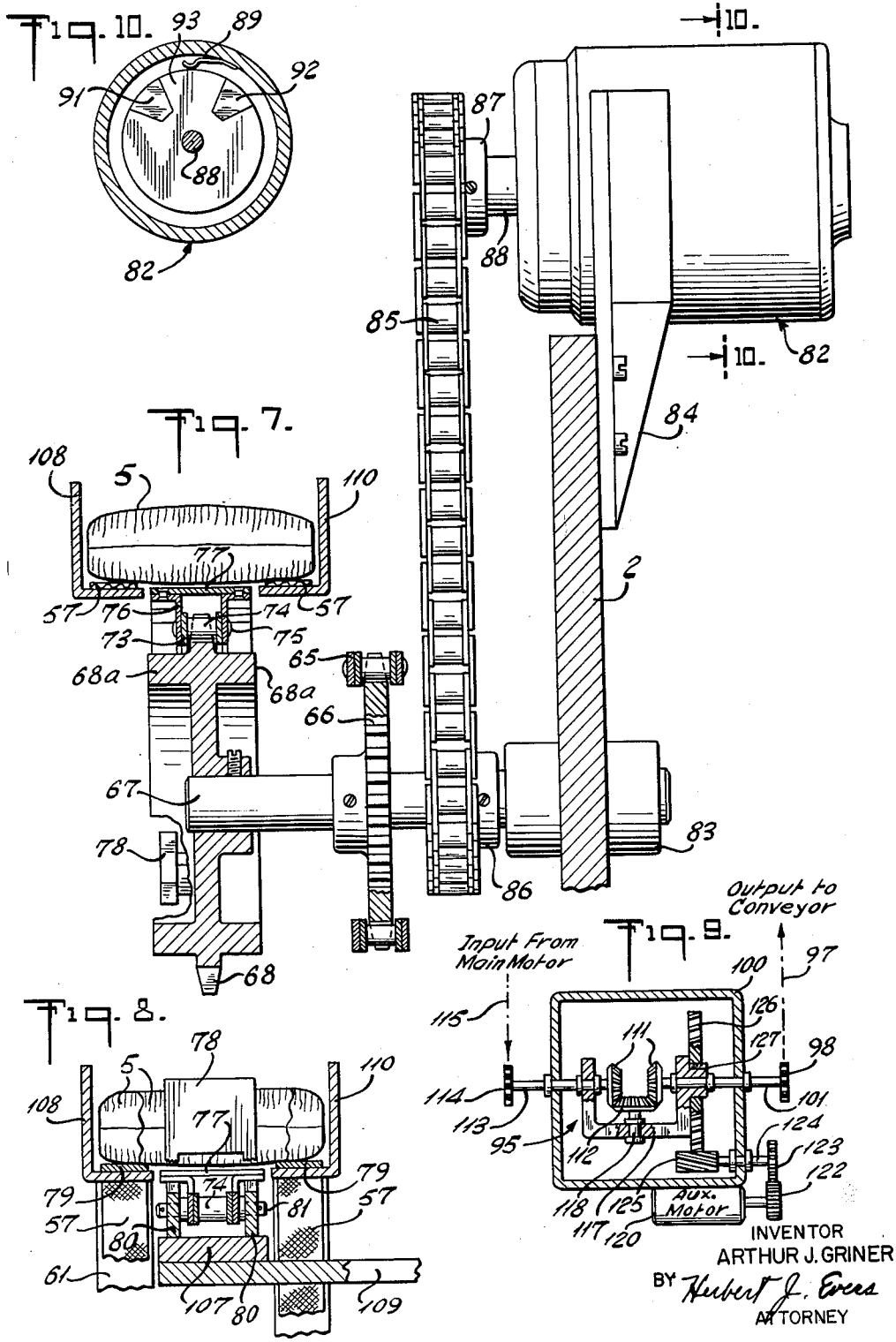
INVENTOR
ARTHUR J. GRINER
BY Herbert J. Evans
ATTORNEY United States Patent Office 3,155,221
Patented Nov. 3, 1964

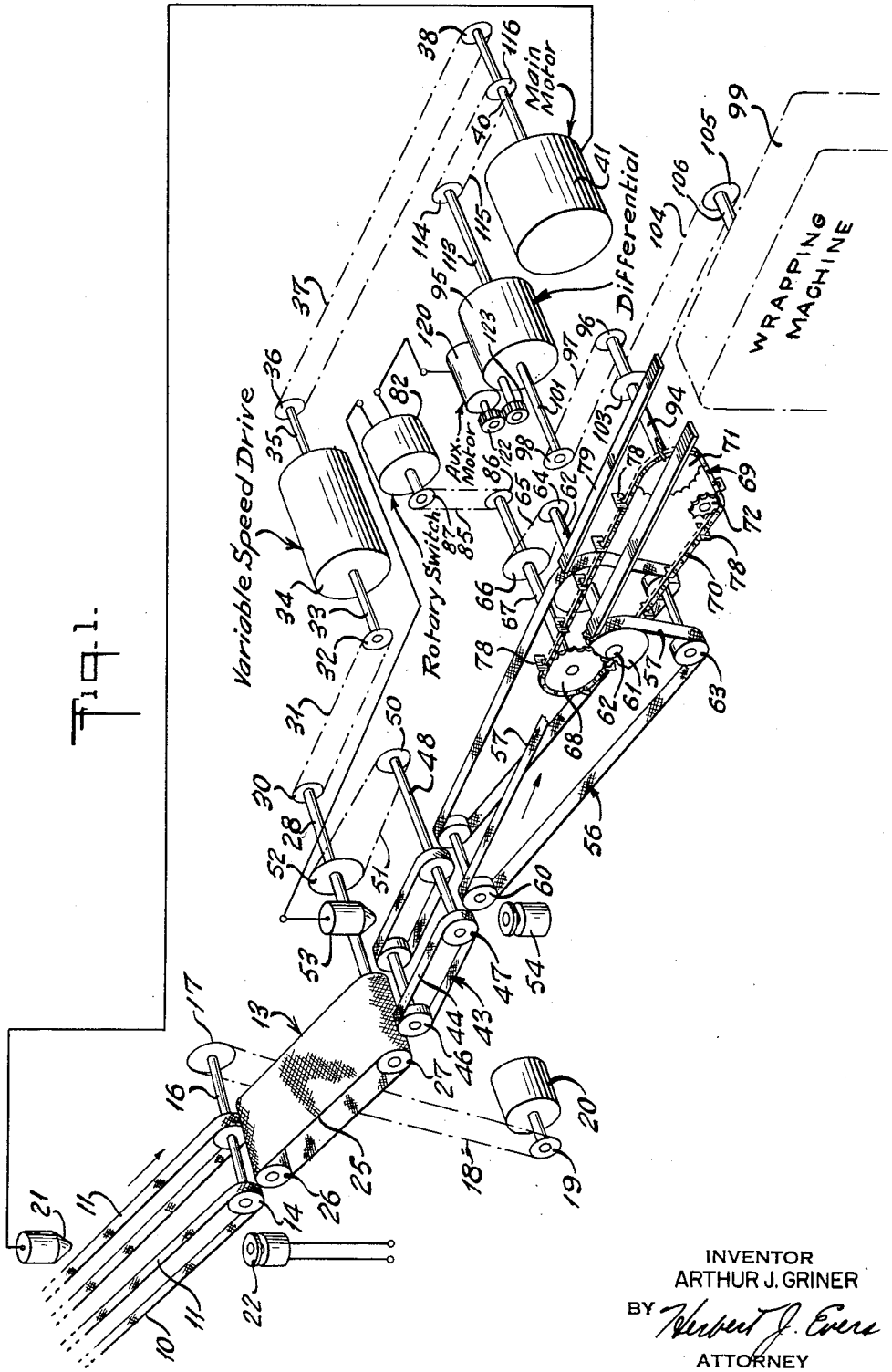

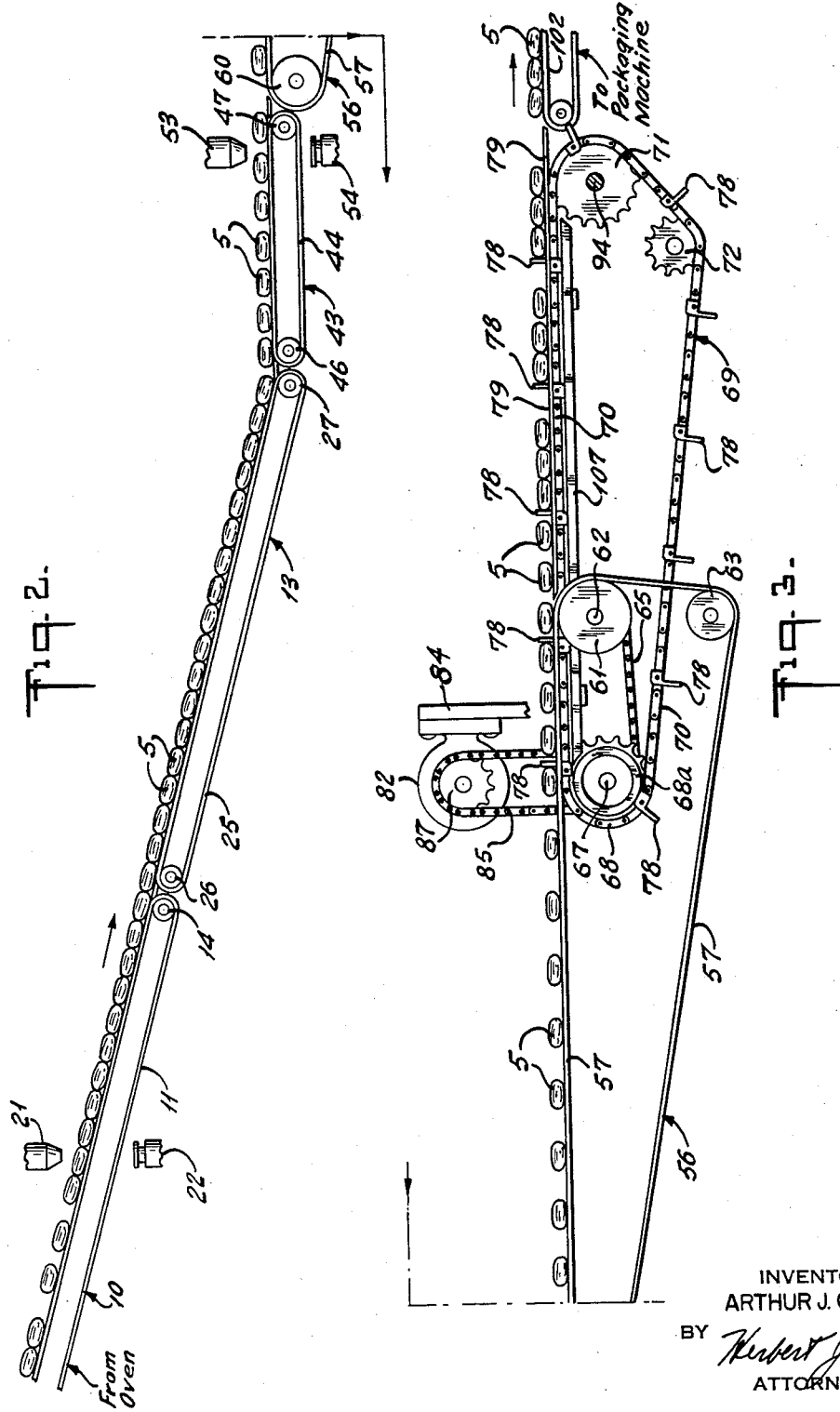

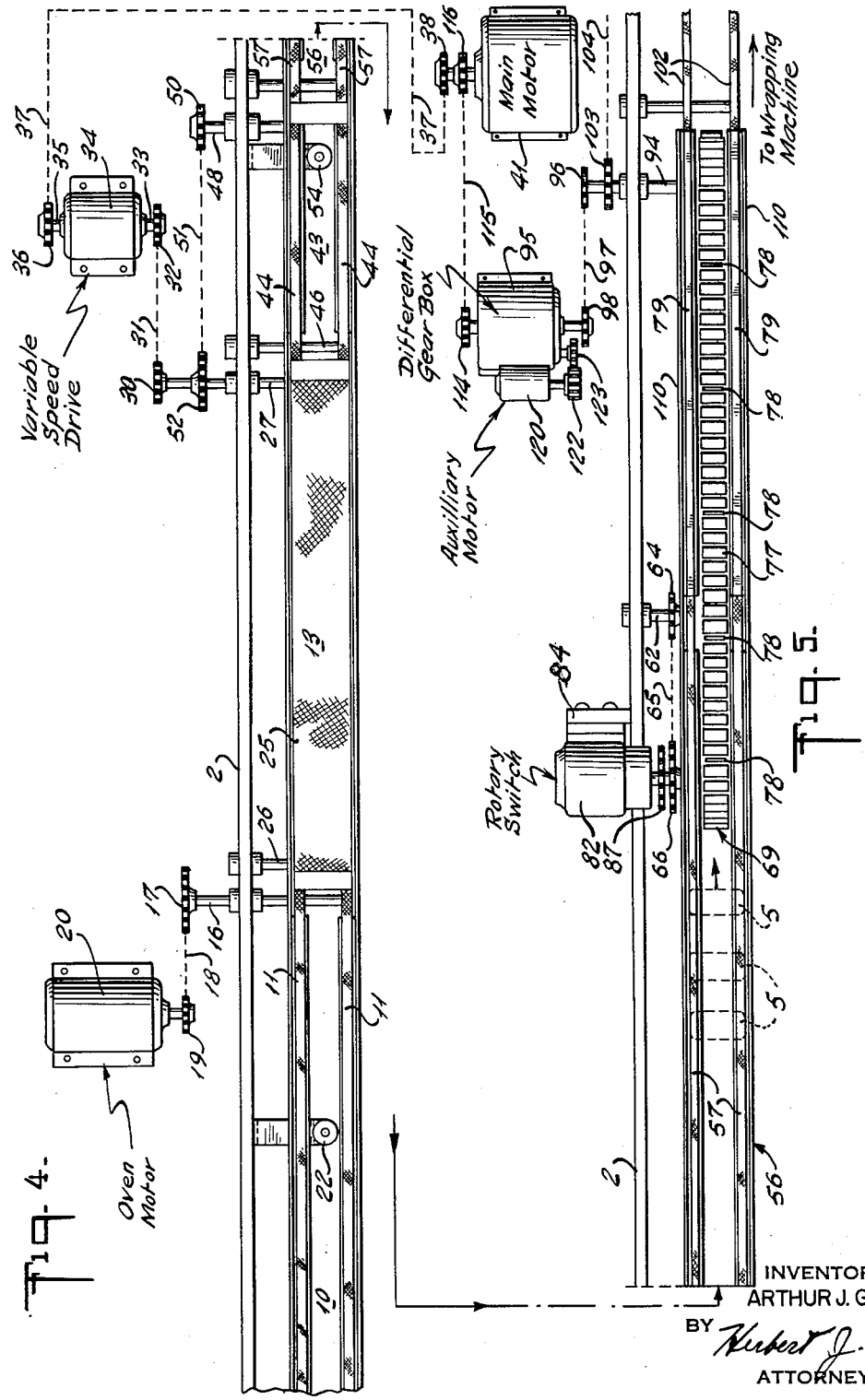

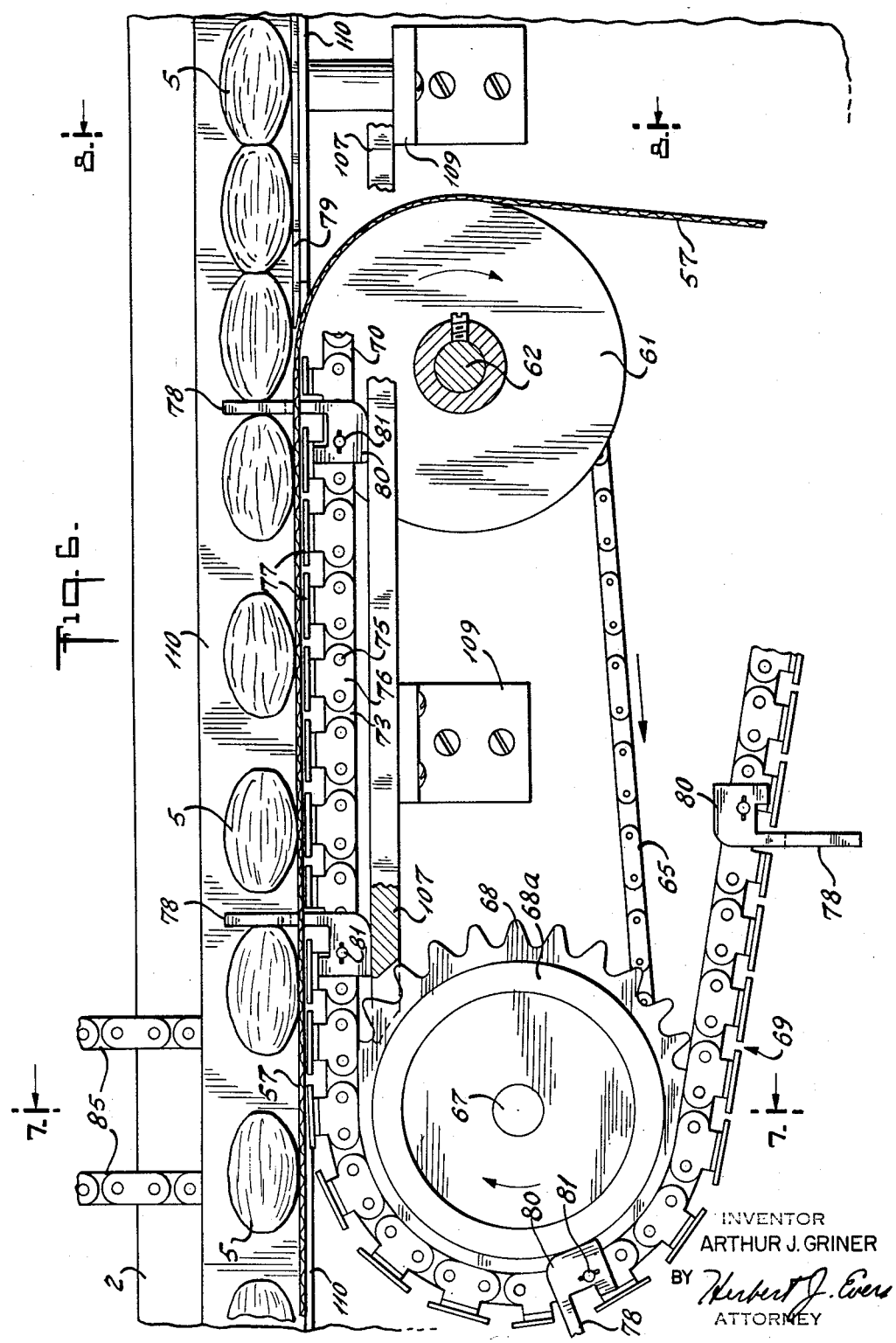

3,155,221
METERING APPARATUS
Arthur J. Griner, Westfield, N.J., assignor to National Biscuit Company, a corporation of New Jersey
Filed Nov. 6, 1961, Ser. No. 150,225
11 Claims. (Cl. 198—34)

This invention relates to improved means for metering articles, and more particularly pertains to an apparatus and method of continuously metering baked goods into groups of packagable units.

In the production of baked goods, such as shredded wheat biscuits, there is a problem in metering them into groups of packagable units. Because shredded wheat biscuits are fragile and require careful handling, the manner in which they are handled by existing metering equipment leaves much to be desired. With the development of increased means of production, it has now become more and more desirable to have available improved means for continuously metering a predetermined quantity of baked goods in a manner suitable for subsequent wrapping and packaging.

It is therefore an important object of the present invention to provide continuous means and methods of metering articles flowing along a conveying line.

Another object of the invention is to provide in the delivery of articles from a band oven conveyor belt, improved means for continuously grouping a predetermined number of such articles in coordination with the rate at which the articles are delivered from the band oven.

Another object of the present invention is to provide an apparatus which will convert the uneven, randomly spaced discharge of biscuits emerging from an oven into a continuous delivery of equally spaced biscuit groups of predetermined count.

Another object of the invention is to provide an apparatus which will continuously receive a moving row of unevenly spaced biscuits and segregate them into groups of predetermined count with substantially uniform spacing therebetween, and at the same time coordinate the operation of a wrapping machine to satisfactorily receive and wrap said groups of biscuits.

Still another object of the invention is to provide in an apparatus having a first conveyer system for receiving randomly spaced biscuits and establishing a spacing therebetween, and a second conveyer system for grouping the spaced biscuits of the first conveyer system into packagable units, means for synchronizing the operation of the second conveyer system with said first conveyer system to assure a delivery of packable units from said second conveyer system independent of variations of spacing provided by said first conveyer system.

Other objects, features and advantages of the present invention will be apparent from a detailed description of a preferred embodiment thereof taken in conjunction with the drawings in which:

FIG. 1 shows a flow sheet arrangement of the apparatus of the invention;

FIG. 2 is a side elevation of a portion of the apparatus shown in FIG. 1;

FIG. 3 is a continuation of FIG. 2 showing an adjoining portion of the apparatus;

FIG. 4 is a plan view of the apparatus shown in FIG. 2;

FIG. 5 is a continuation of FIG. 4 showing a plan view of the apparatus shown in FIG. 3;

FIG. 6 is an enlarged fragmentary view in elevation of the flight conveyer shown in FIG. 3 with parts removed to show underlying details;

FIG. 7 is a detailed view in section taken on the line 7—7 of FIG. 6;

FIG. 8 is a sectional view of the conveyer flight chain taken on the line 8—8 of FIG. 6;

FIG. 9 is an enlarged plan view of the differential gear box and auxiliary motor shown in FIG. 5 with the cover removed to show underlying parts; and FIG. 10 is a sectional view taken along line 10—10 in FIG. 7, showing details of the rotary switch.

For convenience, the invention will be described in connection with the metering of shredded wheat biscuits. It is, however, to be understood that the invention applies equally well to other baked goods such as cookies, crackers and cakes, as well as other articles or commodities.

In accordance with the invention, a downwardly inclined conveyer infeed assembly 10 receives a row of randomly spaced biscuits 5 discharging from a band oven (not shown) and transfers them to an accumulator belt 13. The accumulator belt 13 is run slightly slower than the infeed conveyer 10 to close the spacing between biscuits and cause them to accumulate or back up along the infeed conveyer 10. The conveyer infeed assembly 10 runs continuously at the same constant speed as the oven belt and includes a photoelectric station 21 which is operatively connected to a drive motor 41 for the accumulator belt 13 to control the height of accumulation. When biscuits or articles accumulate on the belt 25 and up onto the parallel belts 11 they may reach a point cutting off the light beam emitted between the belts 11 from the light source 22 towards the photoelectric cell 21, thus providing a signal to increase the speed of the main motor 41. As the motor 21 accelerates, the speed of the entire infeed line as well as the wrapping machine is increased in order to effectively reduce accumulation of biscuits to a normal level. The accumulator belt 13 carries the close-packed biscuits 5 stacked in side by side relationship to a spacing belt assembly 43 operating at a faster linear speed than the accumulator belt 13 to space the biscuits a predetermined distance apart.

Once spacing has been established, the biscuits are transferred to a step-up conveyer 56 which extends the spacing between biscuits. At a suitable point along the step-up conveyer 56 a flight assembly 69 comprising a plurality of flights 78 properly spaced on an endless belt 70 is inserted at the proper time behind a metered quantity of biscuits.

When the metered biscuits reach the end of the step-up conveyer 56, they are advanced by the flights 78 in metered pack formation along article supporting rails 79 to an endless belt 102. There, the flights 78 rotate out of engagement and the belt 102 advances each metered group to a packaging machine.

To compensate for any variations that may occur in the spacing between biscuits, a second photoelectric station 53 is provided, preferably in the vicinity of the spacing conveyer 43, in circuitry with a rotary switch 82 for an auxiliary motor 120 for correspondingly modifying the speed of the flight conveyer assembly 69. This permits the desired number of biscuits to be metered independently of the rate at which biscuits are discharged by the band oven. Thus the equipment will automatically produce from an advancing column of randomly spaced biscuits metered quantities of biscuits in pack formation in proper condition for packaging.

*Conveyer Infeed Assembly and Accumulator*

Referring especially to FIG. 1, also FIGS. 2 and 3, a downwardly inclined infeed conveyer 10 comprising parallel endless belts 11, 11, spaced apart suitably to support shredded wheat biscuits with their longitudinal axis transversely disposed thereon, receives biscuits 5 discharging from a band oven (not shown) and transfers them to an accumulator belt 13 leading downwardly therefrom. The lower ends of the belts 11 are passed around driven pulleys 14 mounted on a drive shaft 16 having a sprocket 17 keyed thereto. A drive chain 18 is passed around the sprocket 17 and a drive sprocket 19 which is keyed to the motor shaft of the oven conveyer motor 20.

Adjacent the conveyer 10, preferably a suitable distance thereabove and spaced medially of the belts 11, a photoelectric cell 21 is suitably supported by brackets (not shown). A light source 22 casts a beam of light toward the active portion of the photoelectric cell 21 whenever a spacing occurs between the biscuits 5 on the conveyer 10, thus indirectly indicating the height of accumulated biscuits along the conveyer assembly 10. As seen in FIG. 1, the photoelectric cell 21 is in circuitry with the main motor 41, which as will be later seen, controls the speed of the accumulator belt.

The accumulator belt 13 comprises an endless belt 25 which passes around a pulley 26 and a driven pulley 27 mounted on a drive shaft 28. To drive the pulley 27 there is preferably keyed to the end of the shaft 28 a sprocket 30 around which is passed a chain 31 driven by a drive sprocket 32 fixed to an output shaft 33 of a variable speed drive 34. The variable speed drive 34 is operatively connected to the main motor 41 by means of a drive chain 37 around pulleys 36, 38 mounted respectively on shafts 35, 40 of the variable speed drive 34 and the main motor 41. It will be understood that if so desired, the variable speed drive 34 may be dispensed with and shafts 28 and 40 may be directly connected by a suitable drive chain.

A suitable supporting frame 2 (see FIGS. 4 and 5) is provided for supporting the various conveyer assemblies and need not be further described.

Spacing Conveyer Assembly

Positioned adjacent to and leading from the accumulator conveyer 13 is a space detecting conveyer 43 which comprises parallel belts 44 which are passed around a pair of idler pulleys 46 and extend to and around a pair of drive pulleys 47. A drive shaft 48, on which the pulleys 47 are fixedly mounted, is rotated by a sprocket 50 secured thereon. A drive chain 51 passes around the sprocket 50 and extends to and around a sprocket 52 which is keyed to the previously described drive shaft 28. The sprocket 50 has a diameter relatively smaller than that of the sprocket 52. Consequently, the conveyer 43 will always travel at a faster linear speed than the accumulator 13 although they are both operated from a common drive shaft 28.

Suitably mounted above the space detecting conveyer 43 is a second photoelectric station comprising a photoelectric cell 53. Mounted directly below on a bracket suspended from frame 2 medially of the belts 44, there is provided a light source 54 which casts a beam of light toward the photoelectric cell 53 whenever there is an intervening space between adjacent biscuits traveling on the conveyer 43. The photoelectric cell 53 is connected in circuitry with a rotary switch 82 for an auxiliary motor 120, the purposes of which will be later described in connection with the flight conveyer assembly 69.

Adjacent the conveyer 43 and leading directly therefrom is a step-up conveyer 56 which comprises parallel belts 57, 57 suitably spaced to support shredded wheat biscuits in similar manner to belts 11 and 44. The step-up belts 57 pass around pulleys 60, 61 and idler pulley 63, and are driven by a drive shaft 62 connected to pulleys 61. At one end of the shaft 62 there is fixed a driven sprocket 64 around which is passed a drive chain 65. Means for driving the chain 65 is provided by a driving sprocket 66 fixed to a shaft 67.

Securely attached to the end of the shaft 67 there is provided a large diameter sprocket wheel 68 which forms part of the flight conveyer 69 and is driven by an endless flight chain 70. The chain 70 extends to and is trained around a driving sprocket 71 from which it further extends to and is passed around an idler 72. From thence it returns to sprocket wheel 68.

The flight chain 70 is comprised of spaced pairs of roller chain plates 73 (see FIG. 7) separated by rollers 74 rotatably mounted on pivots 75. Each pair of side plates 73 is linked by its pivot 75 to a pair of opposed brackets 76. Riveted to each pair of brackets 76, thus forming a straddle across but not touching the underlying teeth of the sprocket gears 68, 71 and 72, is an article supporting plate 77. A plurality of plates 77 are thus linked together by the flight chain 70 to provide an articulated carrier surface for delivering spaced groups of biscuits into a wrapping machine.

Means for grouping and spacing of the biscuits is provided by a plurality of spaced flights 78 (see FIGS. 1, 3, 5, 6 and 8) each of which comprises an L-shaped bracket formed with an upstanding finger the lower part of which is bifurcated to form a straddle terminating in a pair of right angular side plates 80 which are linked by a shoulder pivot 81. In the specific embodiment disclosed herein, a flight 78 is interposed (see FIG. 6) between each group of seven article support plates 77 thus providing a spacing between flights equivalent to approximately four biscuits. It will be noted that the specific embodiment herein shown provides for spaced groups of three biscuits each, the extra space being provided to allow sufficient room for the packaging machine to carry out its functions.

Referring especially to FIGS. 3, 5 and 8, it will be seen that the flight conveyer 69 is so positioned with respect to the step-up conveyer 56 that the flights 78 will be carried into the path of a biscuit column advancing on the spaced belts of said conveyer 56.

Means for synchronizing the flight conveyer to correspond with any variations in the spacing between biscuits along the conveyer 43 comprises a rotary switch 82. Referring to FIGS. 1, 3, 5 and especially to FIG. 7, it will be seen that the shaft 67 is rotatably mounted in a journal 83 mounted on the side frame 2. Attached securely to the frame 2 is a bracket 84 which supports the rotary switch 82. Means for driving the switch 82 is provided by a chain drive 85 which is passed around a sprocket 86 fixed to the shaft 67 and a driven sprocket 87 secured to the driving shaft 88 of the rotary switch 82.

As shown in FIG. 10, the rotary switch 82 is a conventional rotating commutator (see FIG. 10) provided with a pair of electrical contact points 91 and 92 separated by an insulated segment 93. A brush 89 bears against the surface of the commutator. When the spacing between biscuits is such that a faster flight speed is necessary to handle it, the brush makes contact with contact 91 to complete an electrical circuit to the auxiliary motor which advances the speed of the flight conveyer 69. The precise operation of this device in connection with the flight conveyer timing will be described later in connection with the differential gear drive 95. Similarly, when a slower flight conveyer speed is called for, the brush makes contact with contact 92 which reverses the auxiliary motor to retard the flight speed. Whether the brush contacts 91 or 92, is determined by the signal transmitted by the photoelectric cell 53 to the auxiliary motor.

Briefly and in essence, the rotary switch 82 is in circuit with the photo cell tube 53 which conducts current through the circuit whenever it is activated by the light beam disposed across the path of the moving stream of objects carried on the parallel conveyer belts 44. Whenever the objects cut off the light beam, current entering the rotary switch 82 is broken; as soon as sufficient space occurs between two adjacent articles moving across the light beam, the light will penetrate through the intervening space and activate the photo cell tube 53, thus energizing the current to the rotary switch 82; and dependent upon the precise arcuate position of the rotating member of the switch 82 at the moment of energization, i.e. whether the conducting elements 91, 92 (FIG. 10) or neither of them, happen to contact the brush 89 at the moment of current energization, it will determine which circuit, whether it be the "positive" signal coming through contact 92 thus indicating the conveyer is traveling too fast; the "negative" signal coming through contact 91 indicating insufficient speed; or neither of them (insulated non-conducting portion of rotating element) which would indicate a correct rate of article infeed, a correction of the conveyer speed will be effected if required. Thus it may be understood that the rotary switch 82 is basically a sensing device which, through light-beam detection, relates the position of the moving articles at a given point with the feeding requirements of the wrapping machine ahead; and by suitable feedback circuits makes corrections to the conveyer speed through the differential drive 95 to maintain the article feeding at a constant rate.

*Flight Conveyer Assembly*

Means for driving the flight conveyer 69 together with means for automatically adjusting its linear rate of speed comprises a drive shaft 94 to which the flight conveyer sprocket 71 is secured and a differential gear assembly 95 (see FIGS. 1, 5 and especially FIG. 9). The shaft 94 has affixed at one extremity (FIG. 1) a driven sprocket 96 around which is passed one end of a drive chain 97 the opposite end of which is driven by a sprocket 98. Extending through the gear housing 100, the output shaft 101 of the differential gear train 95 has affixed to its outer extremity the aforementioned sprocket 98 for driving the flight conveyer. It is to be noted also (see FIG. 1) that the step-up conveyer 56 is driven from the shaft 94 through the shaft 67, sprocket 66, the drive chain 65, and the shaft 62. Also, the wrapping machine designated 99 is drivingly connected with the drive shaft 94 by means of a sprocket 103 and a drive chain 104 which drives a sprocket 105 on the shaft 106 of the wrapping machine. Inasmuch, however, as the wrapping machine 99 does not form a part of this invention, it is indicated merely in dot-and-dash outline.

Suitable gearing is provided in order that the step-up conveyer and flight conveyer may be driven at the same relative speed with respect to one another, inasmuch as the step-up conveyer 56 is provided with a pulley ratio which drives it constantly at a higher linear speed than the adjoining flight conveyer 69.

Referring to FIG. 6, it will be noted that the flights 73 which are loosely pivoted to the flight chain 70, are carried clockwise about the sprocket 68, the upper level of the chain riding over a horizontal guide bar 107 supported by brackets 109 attached to the frame 2. Upon approaching the sprocket 68 each flight 73 will contact the annular camming ring 68a causing the flights to swing to a position perpendicular to the tangent formed on the periphery of the sprocket 68 at the pivot point of each flight. As each flight leaves the sprocket 68 and passes over the guide bar 107 it will become locked in its erect position due to contact of its side plate 80 thereon.

Forming an open channel to align the column of advancing biscuits there is provided a pair of angle brackets 108 and 110, respectively, over which the belts 57 are supported.

*Differential Gear Drive*

The differential gear box 95 which is shown schematically in FIG. 1, in plan view in FIG. 5 and in enlarged detail in FIG. 9, comprises a set of bevel gears 111 and 112 operatively connected to an input shaft 113. Secured to the input shaft 113 is a sprocket 114 around which is passed a drive chain 115 driven by a sprocket 116 keyed to the drive shaft 40 of the main motor 41. As viewed in FIG. 9, the left hand one of the bevel gears 111 is fastened upon shaft 113 which is rotatable in a U-shaped yoke 117 itself suitably supported for rotation on the axis of shaft 113. Secured medially on the yoke 117 is a stub shaft 118 which rotatably supports the bevel gear 112 in mesh with gears 111. The right hand one of the gears 111 is fixed to the output shaft 101.

Externally of the gear housing 100 there is securely mounted thereon a reversible auxiliary motor 120 which is drivingly connected to the rotatable yoke 117 within the differential gear housing 100 by a drive gear 122 in mesh with a driven gear 123 fixed to a shaft 124 extending through the gear housing 100. Within the housing there is fixedly mounted on the shaft 124 a spiral pinion 125 which is drivingly connected to a helical gear wheel 126 keyed to a spline shaft 127. The spline shaft 127 is formed integral with the yoke 117 and provides a journal bearing for free rotation on the output shaft 101. The auxiliary motor 120, being instantaneously reversible by a change in polarity of current occasioned by the signal from the photo cell 53 and the position of the commutator in the rotary switch, is in this manner effective to rotate the yoke 11 either clockwise or counter-clockwise. Rotation of the yoke 11 is independent of the main driving connection through bevel gears 111, 112 but is effective, nevertheless, to either add or subtract from rotation of the output shaft 101. Thus, a positive electrical impulse to the auxiliary motor 120 will rotate the yoke 117 in one direction to advance the constant speed of the output shaft 101, whereas a negative impulse to the auxiliary motor will retard the speed of the output shaft 101. As a consequence, the linear speed of the apparatus which is drivingly connected thereto, i.e., the step-up conveyer, the flight conveyer 69, and the wrapping machine 99, may be synchronously advanced or retarded as necessity demands.

*Infeed Conveyor Operation*

In operation, the biscuits 5 move forwardly from the band oven onto the belts 11 longitudinally, but oriented transversely to the direction of travel on the inclined conveyer 10. The biscuits advance onto the accumulator 13, the space detecting conveyer 43, the step-up conveyer 56 and the flight conveyer 69 directly via belt 102 into the wrapping machine 99. Inasmuch as the accumulator belt 13 must follow the speed of the oven, the operator will initially set the speed of the accumulator belt 13 and the space detecting conveyer 43 by manual adjustment of the variable speed drive 34. Subsequently, the conveyer 10 will commence to accumulate biscuits more rapidly than they are absorbed by the wrapping machine ahead and, as they continue to build upwardly on the incline, will block the light beam from the illuminating device 22, thus interrupting the activation of the photoelectric cell 21. As a result, the signal from the photoelectric cell 21 to the main motor 41 will increase its rate of speed and as a consequence the wrapping machine 99 will be accelerated to absorb the biscuits accumulating on the conveyer 13. As the accumulation of biscuits decreases, the light beam from the illuminating device 22 to the photocell 21 will be unblocked, thus retarding the speed of the main motor to restore the supply of biscuits on the inclined conveyor 10 to normal. The main purpose, therefore, of the photoelectric cell 21 is to determine whether or not there is an accumulated condition of biscuits up to this point on the incline. This is necessary in order to maintain a constant supply of biscuits to the wrapping machine 99 which is provided by controlling the over-all speed of the infeed conveyer and the wrapping machine.

The linear speed of the accumulator belt 13 is adjusted through the variable speed drive 34 so that it will travel at a relatively slower rate than the inclined conveyer 10 from the oven. The over-all effect will be a solidification of the biscuit line, eliminating all spacing between the individual biscuits. This is the first step in ultimately attaing a predetermined spacing and grouping.

After traversing the slower moving accumulator belt 13, the biscuits advance onto the spacing conveyer 43 while passing the photoelectric cell 53. The linear speed of the spacing belts 44, 44 is relatively faster than that of the preceding accumulator belt 13. As the biscuits advance onto the faster belt from the slower moving belt, they will commence to separate a desirable distance from each other of approximately one-half inch. The relative speed ratio between the two belts remains constant, because of their common drive shaft (see FIG. 1) and the difference of sprocket diameters between the sprockets 52 and 50, the latter having the lesser diameter. When traversing the spacing conveyer 43, every third biscuit space will be scanned by the photoelectric cell 53 which is in circuit with the rotary switch 82. The main object of the electric eye station at this point is to determine the position of the biscuits, especially the intervening space in order to correct the speed of the flight conveyer so that the individual flights 78 will enter a space between every third biscuit as the biscuits advance over the step-up conveyer 56.

In summation: whenever the light beam from the light source 54 strikes the photoelectric cell 53 while the rotary switch segment 93 is in circuit therewith, no action of the differential gear drive is effected, inasmuch as this condition would indicate that the biscuit spacing is ideal and that it will coincide with the arrival of the flight fingers 78 and with the operating cycle of the wrapping machine elements; should the biscuits advance too fast on the spacing conveyer 43, the step-up conveyer 56 will require acceleration to open the distance between adjacent biscuits thus effecting synchronization with the flight fingers; and, if the opposite condition should prevail, i.e., if the biscuits are advancing faster than the speed of the wrapping machine, the step-up conveyer 56 will be momentarily retarded in order to effect registration of the flight fingers with the biscuit spacing.

It is to be noted that the linear speed of the step-up conveyer 56, the flight conveyer 69 and the wrapping machine 99 always remains relatively constant, i.e., they are driven in unison by the differential gear drive 95, never changing relatively with either one or the other; whereas the linear speed in relation to the speed of the spacing conveyer 43 will be automatically adjustable under control of the differential drive acting through the rotary switch 82 and the photoelectric cell 53.

As the biscuits advance into the faster travelling step-up conveyer 56 (FIG. 3) from the spacing conveyer 43, the spacing between each biscuit is increased to approximately three inches. The flight fingers 78 on the flight conveyer 69 are spaced approximately ten inches apart so that there will be an intervening space equivalent to four shredded wheat biscuits, their individual width averaging approximately 2½ inches. As a consequence the traveling flight fingers which project upwardly between each third biscuit, will entrap three biscuits between each flight pair. As seen in FIG. 6 and in FIG. 3, each group of three biscuits will be evenly distributed at the entrance to the flight conveyer. Since the flight conveyer 69 travels relatively slower than the belts 57, 57 on the step-up conveyor 56, the leading biscuit of each group will abut with the slower moving flight finger 78 preceding it. At the forward end of the step-up conveyer, belts 57, 57 take off in a downward direction around the pulleys 61 so that forward momentum to the biscuits will now be transferred to the trailing flight finger 78. As a result, each biscuit group will gravitate toward the rear flight finger which will now propel the entire group forward in a compact series of three contacting biscuits separated by even spacing of approximately 2½ inches from the preceding flight. With this arrangement, the biscuits are correctly grouped, spaced and are traveling in synchronism with the operating cycle of the wrapping machine 99.

It will be appreciated that the predetermined quantity of biscuits or other articles to be aligned, spaced and grouped may be changed by an alteration in spacing of the flight fingers 78 on the flight conveyer 69. Similarly, various biscuit shapes and sizes may be used if so desired. Preferably this may be accomplished by changing the width and spacing of the various conveyer belts.

It will be understood, therefore, that this will not alter the principles and scope of the invention and that the invention is not to be restricted to the precise details of the structure hereinbefore shown and described.

What is claimed is:

1. An apparatus for receiving closely spaced articles from an infeed conveyer belt, said apparatus comprising in combination at least one spacing belt operating at a slightly greater linear speed than said infeed conveyer belt for receiving and expanding the spacing between said closely spaced articles, an electric eye station associated therewith to detect the spacing between articles on said spacing belt, a flight conveyer having article engaging flights mounted at equidistantly spaced points thereon to sequentially receive said articles, a connecting conveyer positioned between said spacing belt and said flight conveyer for conveying said articles therebetween, a common drive for said connecting conveyer and said flight conveyer, and said electric eye being operatively connected to said flight conveyer for increasing or decreasing the linear speed of said flight conveyer, whereby the flights thereon will be synchronized with the spacing of articles on said connecting conveyer.

2. An apparatus for advancing articles in spaced groups of predetermined count to a wrapping machine, the apparatus comprising in series relation a first conveyer for receving a row of randomly spaced articles, an accumulating conveyer for stacking said articles in side by side relationship and a spacing conveyer positioned in receiving relation to said first conveyer to receive articles therefrom, a main driving motor for driving said accumulating conveyer and said spacing conveyer, a step-up conveyer and a flight conveyer, a differential gear drive for driving said step-up conveyer and said flight conveyer, driving connections from said main motor to said differential gear drive, and an electric eye station adjacent said spacing conveyer operatively connected to said differential gear drive, said electric eye station being responsive to the spacing of articles on said spacing conveyer to vary the speed of said differential gear drive, thereby to coordinate the flight conveyer and step-up conveyer with said spacing conveyer.

3. Apparatus according to claim 2 wherein said differential gear drive includes two input drives and a single output drive, the drive of said main motor being one of said input drives, said other input drive being a reversible auxiliary motor and said electric eye-station being in circuit with said auxiliary motor and said differential gear drive.

4. An apparatus according to claim 2 wherein said flight conveyer comprises an endless driven chain with article engaging flights mounted thereon at equidistantly spaced points, and a rotary switch driven by said flight conveyer and disposed in circuitry with said electric eye station for timing the occurrence of spacing between articles carried on said spacing conveyer.

5. Apparatus according to claim 4 wherein said rotary switch includes a leading-zone conducting segment, said segment being in circuit with said electric eye station and said auxiliary motor when the spacing between said articles traveling on said spacing conveyer is advancing ahead of the relative positions of said article engaging flights on said flight conveyer whereby the output of said differential gear drive may be correspondingly adjusted to bring the relative positions of said flights to register with the spacing of said articles.

6. Apparatus according to claim 4 wherein said rotary switch includes a lagging-zone conducting segment, said segment being in circuit with said electric eye station and said auxiliary motor when the spacing between said articles traveling on said spacing conveyer is lagging behind the relative positions of said article engaging flights on said flight conveyer whereby the output of said differential gear drive may be adjusted to bring the relative positions of said flights to register with the spacing of said articles.

7. Apparatus according to claim 4 wherein said rotary switch includes a non-conducting segment, said segment blocking the circuit from said electric-eye station to said auxiliary motor when the spacing between said articles traveling on said spacing conveyer is synchronized with the relative positions of the article engaging flights on said flight conveyer.

8. In a system for receiving randomly spaced articles, compressing the spacing between said articles, and thereafter substantially uniformly enlarging the spacing therebetween in preparation for packaging a metered quantity thereof, a metering device comprising the combination of a first photo-electric station and a second photo-electric station, said first photo-electric station being located in the vicinity wherein said articles are being compressed, and said second photo-electric station being in the vicinity where said articles are being substantially uniformly spaced, a flight conveyer having article engaging flights thereon at equidistantly spaced points positioned in receiving relation in the vicinity where said articles are being substantially uniformly spaced, and a differential gear drive for driving said flight conveyer under operational control of said first and second photo-electric stations to increase and decrease the speed of said flight conveyer whenever said spacing between said articles is out of registration with the relative positions of said article flights.

9. An apparatus for advancing a line of baked articles from a traveling band oven to a wrapping machine, said apparatus comprising a first conveyer for receiving randomly spaced articles from said band oven, a second conveyer positioned in receiving relation to said first conveyer and traveling slower than said first conveyer to compact said articles thereon, a third conveyer positioned in receiving relation to said second conveyer and traveling faster than said second conveyer to separate said articles approximately equidistantly thereon, photo-electric means associated with said third conveyer to detect the occurrence of spacing between the articles carried on said third conveyer, a flight conveyer positioned in receiving relation to said third conveyer, said flight conveyer being formed with articles segregating flights equidistantly spaced thereon, means for adjusting the speed of said flight conveyer to register said flights with the spacing of said articles on said third conveyer, said means comprising a differential gear drive, an output shaft in said differential drive for driving said flight conveyer, a main input shaft to said differential drive, a motor for driving said input shaft, a second input shaft to said differential drive, auxiliary motor means to drive said second input shaft, said auxiliary motor being responsive to an applied signal from said combined photo-electric means and said rotary switch whereby said auxiliary motor will rotate said second differential input shaft in a forward direction to increase the speed of rotation of said differential output shaft.

10. Apparatus according to claim 9 wherein said auxiliary motor is phase reversible in response to a prearranged signal from said photo-electric means and said rotary switch whereby said motor will drive the second input shaft of said differential drive in a reverse direction to decrease the output speed of said drive.

11. Apparatus according to claim 9 wherein said auxiliary motor is reversible back and forth in synchronization with the relative positions of the spacing between articles advancing on said third conveyer to adjust the output speed of said differential drive to conform therewith.

References Cited by the Examiner

UNITED STATES PATENTS

| 2,221,396 | 11/40 | Evoy | 198—37 |
| 2,966,253 | 12/60 | Gerrans | 198—37 |
| 3,071,236 | 1/63 | Hahn | 198—34 X |

FOREIGN PATENTS 713,388  7/54  Great Britain.

SAMUEL F. COLEMAN, *Acting Primary Examiner.*

EDWARD A. SROKA, *Examiner.*